United States Patent

Quinn

[15] 3,648,679
[45] Mar. 14, 1972

[54] COLLAPSIBLE BARBECUE APPARATUS

[72] Inventor: Daniel P. Quinn, 6030 Halifax St., Burnaby, British Columbia, Canada

[22] Filed: June 16, 1970

[21] Appl. No.: 46,718

[52] U.S. Cl..............................................126/25 A, 126/9 R
[51] Int. Cl. .......................................A47j 37/00, F24b 3/00
[58] Field of Search................................126/9, 25, 25 A, 30

[56] References Cited

UNITED STATES PATENTS

| | | | |
|---|---|---|---|
| 2,080,109 | 5/1937 | Brennan | 126/25 |
| 2,122,275 | 6/1938 | Bitney | 126/25 |
| 2,559,243 | 7/1951 | Brown | 126/9 |
| 3,081,694 | 3/1963 | Lipsey | 126/9 X |
| 3,342,122 | 9/1967 | Blinn | 126/25 A X |

Primary Examiner—Charles J. Myhre
Attorney—Lyle G. Trorey

[57] ABSTRACT

Collapsible barbecue apparatus having a pair of end frames releasably connected in upright, spaced apart relationship and a grill disposed between the frames. Connectors loosely connecting the grill and the end frames provide vertical adjustability of the grill.

7 Claims, 5 Drawing Figures

Patented March 14, 1972

Daniel P. Quinn,
Inventor by Lyle O. Trorey,
Agent

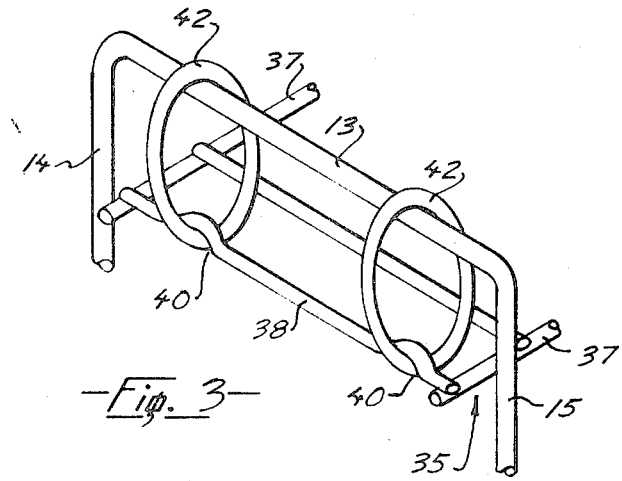
Fig. 3
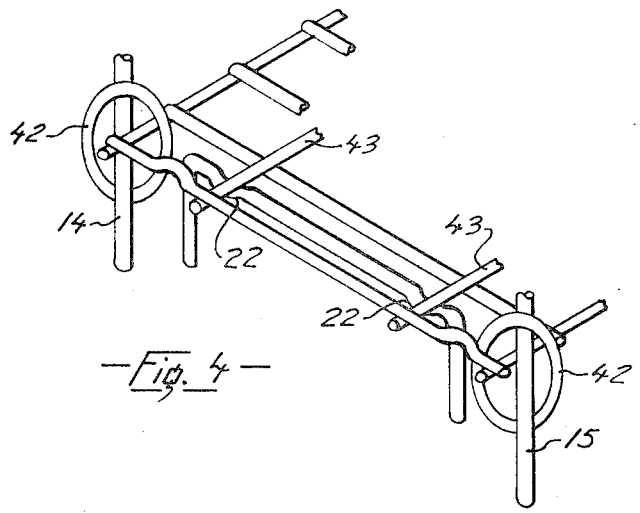
Fig. 4
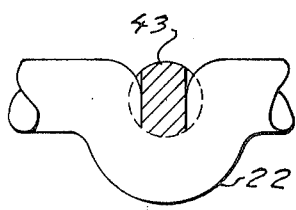
Fig. 5
Daniel P. Quinn,
Inventor
by 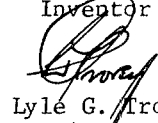
Lyle G. Trorey,
Agent

COLLAPSIBLE BARBECUE APPARATUS

BACKGROUND OF THE INVENTION

1. Field of the Invention

This invention relates to a portable collapsible barbecue apparatus.

2. Prior Art

Collapsible barbecue apparatus for cooking outdoors is well known. One type of apparatus uses connectors such as sleeves and thumb screws for connecting several components. This type is usually adjustable to permit adjustment of height of food being cooked above coals or other combustible fuels and is rather expensive. Components which are separable when the apparatus is collapsed can be, and frequently are, lost.

Another main type of barbecue apparatus is usually made of wire and does not incorporate adjustable type connectors such as sleeves and thumb screws, and is consequently much less expensive. This type is not usually readily adjustable.

SUMMARY OF THE INVENTION

Barbecue apparatus of the present invention is, like the last mentioned type, made of wire, several components being connected by ring connectors so that the entire apparatus can be collapsed into a neat package. The connected components are not separable—this substantially reduces chances of one or more of them being lost.

The barbecue apparatus of the present invention is inexpensive to fabricate and simple to assemble and disassemble.

The present barbecue apparatus includes a pair of inverted U-shaped end frames, each frame having end bars, the end bars of the grill being connected to the crossbars of the end frames by ring connectors, and has (or includes) means for releasably connecting the end frames in spaced parallel upright positions, the ring connectors having a loose slidable fit over the crossbar and legs so that the grill can be vertically adjusted on the end frames.

The barbecue apparatus of the present invention also includes inverted U-shaped supports mounted between the legs of each end frame across which spits are arranged, and spits adapted to extend between the supports.

A detailed description following, related to drawings, gives exemplification of preferred embodiment of the invention which, however, is capable of expression in structure other than that described and illustrated.

DESCRIPTION OF THE DRAWINGS

FIG. 3 is an isometric view of a portion of the apparatus with the grill in a second position, FIG. 4 is an isometric view of a portion of the apparatus with the grill in a third position, FIG. 5 is a transverse section of a spit seated in a nest of a spit support.

LIST OF NUMERICAL REFERENCES

| 10 | apparatus |
|---|---|
| 11 | end frame |
| 12 | end frame |
| 13 | crossbar |
| 14 | vertical leg |
| 15 | vertical leg |
| 16 | ends of legs |
| 17 | cross braces |
| 17.1 | cross braces |
| 18 | eye |
| 19 | spit support |
| 20 | crosspiece |
| 21 | legs |
| 22 | seats |
| 23 | crossbar |
| 24 | legs |
| 25 | legs |
| 26 | cross braces |
| 26.1 | cross braces |
| 27 | eyes |
| 29 | spit support |
| 30 | seats |
| 31 | longitudinal brace |
| 32 | longitudinal brace |
| 33 | pintles |
| 35 | grill |
| 37 | side bars |
| 38 | end bars |
| 39 | intermediate bars |
| 40 | loops |
| 42 | ring connectors |
| 43 | spits |
| 46 | pan |

DETAILED DESCRIPTION

Figure 1:
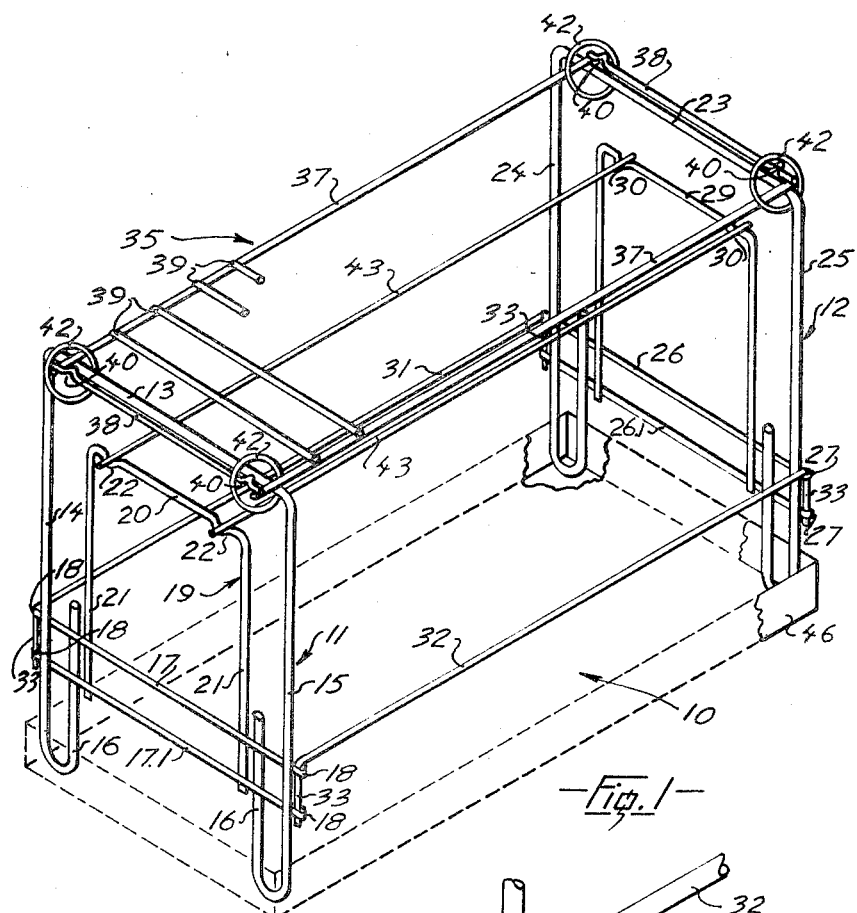
FIG. 1 is an isometric view of assembled barbecue apparatus of the invention, with a grill in a first position.

FIG. 1 shows barbecue apparatus, generally 10, assembled, the apparatus having a pair of U-shaped end frames 11 and 12 each of which is formed of a single length of wire about one-quarter inch in diameter and bent to the shape shown.

Figure 2:
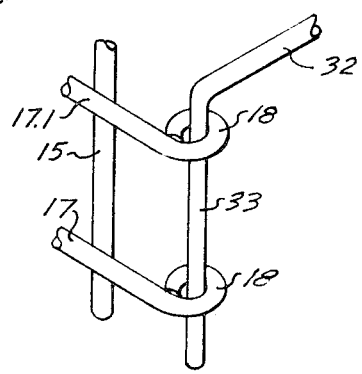
FIG. 2 is an isometric view of a portion of the apparatus illustrating connection of an end frame and a longitudinal brace.

The end frame 11 has a crossbar 13 and vertical legs 14 and 15, having U-shaped ends 16, as illustrated. The crossbar is, typically 16 inches in length. Two parallel cross braces 17, 17.1 space between the cross brace 17 and the crossbar 13 being about ten inches. The cross braces as seen in FIGS. 1 and 2 extend outwards beyond the legs, end of the cross braces being bent to form registering pairs of eyes 18. A spit support 19 of inverted U-shape is connected to the cross braces 17, the spit support having a crosspiece 20 and depending legs 21. The crosspiece is, typically, 10 inches in length and is bent to present a pair of upwardly opening spaced seats 22 adjacent the legs 21.

The end frame 12 is the same as end frame 11, having a crossbar 23 legs 24 and 25, cross braces 26 and 26.1 having registering pairs of eyes 27 and a spit support 29 having spaced apart upwardly opening seats. The cross braces are welded to the end frames and the spit supports are welded to the cross braces.

Both cross braces and spit supports are, typically, wire, one-eighth inch in diameter.

Longitudinal braces 31 and 32, each formed of wire, typically one-quarter inch in diameter extend between the end frames. Each end of each brace is bent to form pintles 33 which fit in the eyes 18 and 27, see FIG. 2. Each pair of registering eyes serves as socket so that with, the pintles fitted in the sockets, the frames are supported in an upright position at a fixed distance apart so as to provide a rigid structure. The braces 31 and 32, it is seen, are means for connecting the end frames in spaced apart parallel relationship.

The apparatus includes a rectangular grill 35 having side bars 37 and end bars 38 and intermediate bars severally 39. The end and side bars of the grill are typically, made of wire one-quarter inches in diameter and the intermediate bars are, typically, one-eighth inch in diameter.

Length of the grill is slightly greater, approximately one inch, than the distance between the crossbars 13 and 23 of the end frames and has a width a little less, approximately 1 inch, than the distance between the legs of the end frames. The end bars 38 of the grill are bent adjacent the side bars to form a pair of downwardly opening half loops 40. As seen in FIG. 1 and 3 four ring connectors severally 42, permanently and loosely connect the end bar of the grill and crossbar of the end frames, the ring connectors having an inside diameter, typically 1½ inches, so that they can be slipped off the crossbars and down the legs of the end frames thus providing vertical adjustment of the grill.

FIGS. 1, 4, and 5

The apparatus 10, see FIGS. 1 and 4, also has a pair of wire spits 43 extending between and resting upon the spit supports, the spits fitting in the upward opening seats 22. As seen in FIG. 5 an end portion of each spit is squared, the seats 22 have a complementary squared shape, as shown so that the spits do not rotate.

The apparatus 10 also includes a pan 46, see FIG. 1, in which hot coals can be placed, dimensions of the pan being such that the ends of the legs can rest in the pan as shown. The pan has a width such that it can be slipped crosswise between the end frames and rest either on the longitudinal braces or on the spits.

OPERATION

FIGS. 1, 3, and 4

It is seen, with reference to FIGS. 1, 3, and 4, that apparatus 10 provides height adjustment of the grill.

FIG. 1 shows the grill in a first position in which it rests upon the crossbar of the end frames. In a second position, as shown in FIG. 3, the grill extends between the legs of the end frames with the ring connectors engaged in the half loops 40. In a third position, see FIG. 4, the grill rests on the spits, with the ring connectors encircling the legs of the end frames.

The grill can be lowered to a fourth position, not shown, in which it rests on the cross braces with the spit supports extending upwards between the end bars and adjacent intermediate bars, the spits first having been removed.

In cooking meat such as hamburgers or hot dogs, the pan 46 can be positioned on top of the spits and the grill can be set either in the first or second position, as shown in FIGS. 1 and 3, depending on how the meat is to be cooked. Foods such as chicken can be spitted with the pan positioned as seen in FIG. 1, or with the pan supported on the longitudinal braces. Cooked foods can be kept warm by removing the pan from either the spits or the longitudinal braces and, placing it beneath the end frames as seen in FIG. 1.

The apparatus can be easily disassembled by removing the spits from the spit supports, disconnecting the longitudinal braces, and then folding the end frames inwards against the grill. The end frames with the grill attached, and the spits, can be sorted in the pan which serves not only as a receptacle for fuel but also as a storage container.

I claim:

1. A collapsible barbecue apparatus including:
   a. a grill having end bars,
   b. a pair of inverted U-shaped end frames each having legs and a crossbar,
   c. means for releasably connecting the end frames in spaced apart parallel relationship,
   d. connectors permanently connecting the end frames and the end bars of the grill,
   e. means for vertical adjustment of the grill,
   f. means on the frame legs for supporting the grill in selected position beneath the crossbar of the end frames.

2. Apparatus as claimed in claim 1 wherein the means
   e. include connectors having a loose slideable fit on the end bars and crossbars and legs of the frames.

3. Apparatus as claimed in claim 1 in which the means
   c. includes:
   i. socket means on each leg of each end frame and,
   ii. longitudinal braces having downwardly extending pintles at each end, the pintles being adapted to fit the socket means.

4. Apparatus as claimed in claim 1 wherein the connectors are rings adapted loosely to connect the end bars of the grill and the legs and crossbars of the end frame.

5. Apparatus as claimed in claim 3 wherein the socket means includes a pair of cross braces extending transversely between the legs of each of the end frames, the cross braces having eyes at opposite ends, the eyes at adjacent ends of each pair of cross braces being in registration for receiving the pintles of the longitudinal braces.

6. Apparatus as claimed in claim 5 including:
   h. a U-shaped support connected in an inverted position to the cross braces of each end frame, each support having a crosspiece disposed below the crossbars of the end frames for supporting spits.

7. Apparatus as claimed in claim 6 in which the crosspieces of the supports have upwardly opening squared seats and an end portion of each spit is squared to fit in the seats so as to prevent rotation of the spits.

* * * * *